United States Patent [19]

Gardineer, Jr. et al.

[11] 4,411,360
[45] Oct. 25, 1983

[54] STORAGE AND RECORD SYSTEM FOR A LARGE NUMBER OF ASSOCIATED IMAGES

[75] Inventors: Bayard G. Gardineer, Jr., Skillman; Charles W. Howlett, Plainfield, both of N.J.

[73] Assignee: Technicare Corporation, Solon, Ohio

[21] Appl. No.: 265,888

[22] Filed: May 21, 1981

Related U.S. Application Data

[63] Continuation of Ser. No. 87,849, Oct. 24, 1979.

[51] Int. Cl.³ .................. B65D 85/30; B65D 85/57
[52] U.S. Cl. .............................. 206/313; 206/444
[58] Field of Search ........... 206/216, 569, 570, 578, 206/225, 226, 312, 313, 455, 444

[56] References Cited

U.S. PATENT DOCUMENTS

| | | | |
|---|---|---|---|
| 1,490,712 | 4/1924 | Rudge | 206/313 |
| 2,480,416 | 8/1949 | Modes | 206/312 |
| 3,199,768 | 8/1965 | Farmlett | 206/312 |
| 3,650,463 | 3/1972 | Christiansen et al. | 206/628 |
| 3,931,644 | 1/1976 | Ward | 206/312 |
| 3,932,895 | 1/1976 | Ward | 206/312 |
| 4,042,106 | 8/1977 | Smith | 206/313 |

FOREIGN PATENT DOCUMENTS 1317316   1/1963   France ........................ 206/312

*Primary Examiner*—Joseph Man-Fu Moy

[57] ABSTRACT

A composite film pack and image storage and retrieval system includes inversely nesting inner and outer envelopes, with a disk film record enclosed within both. For photographic exposure purposes, the inner envelope is at least partially withdrawn and the disk is provided with suitable exposure to apply the sequential images thereto. Thereupon, the inner envelope is reinserted for secure transit of the disk to a development station. Upon development, the inner envelope may be discarded and the outer envelope foreshortened and utilized as a permanent storage and display vehicle.

1 Claim, 6 Drawing Figures

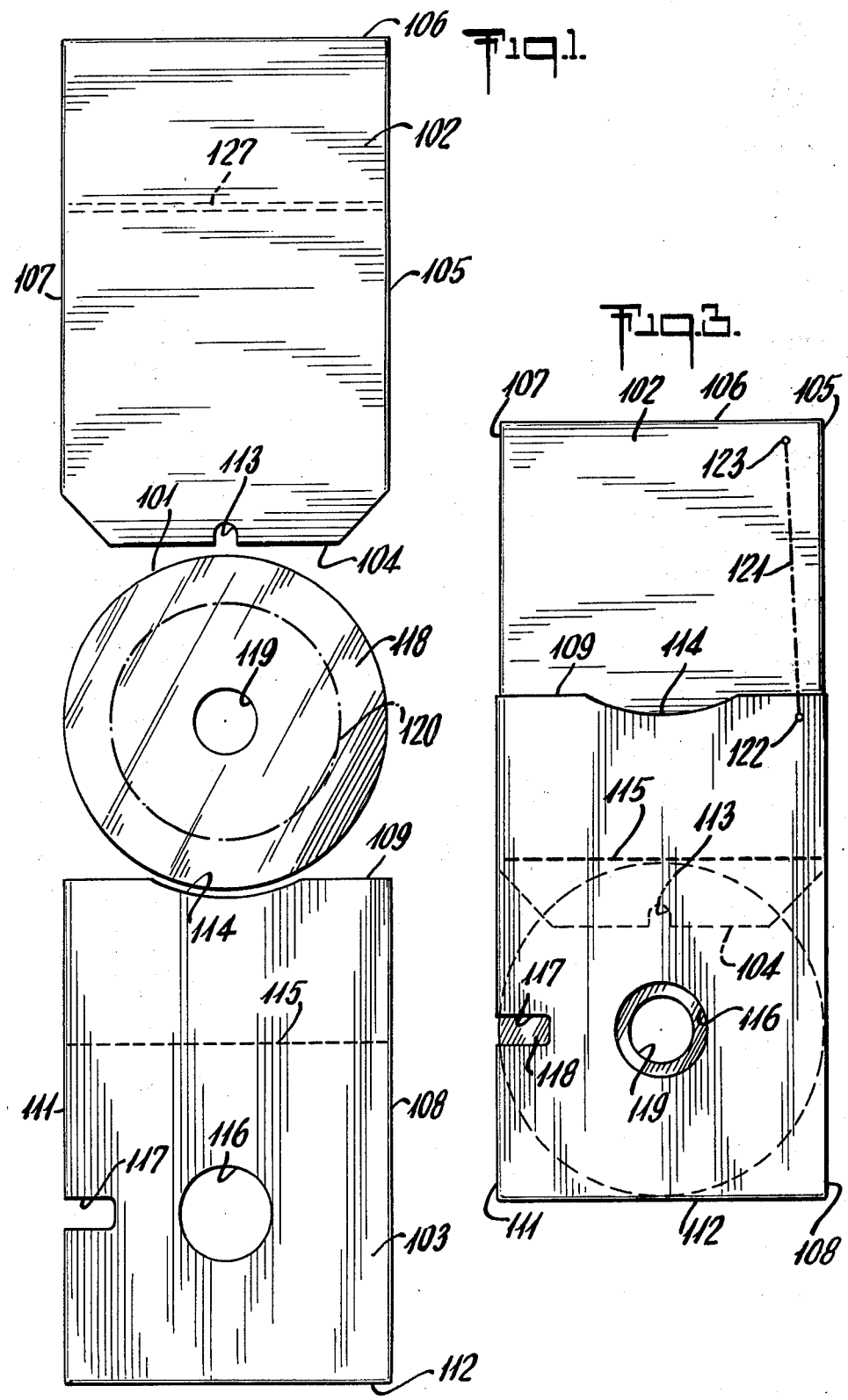

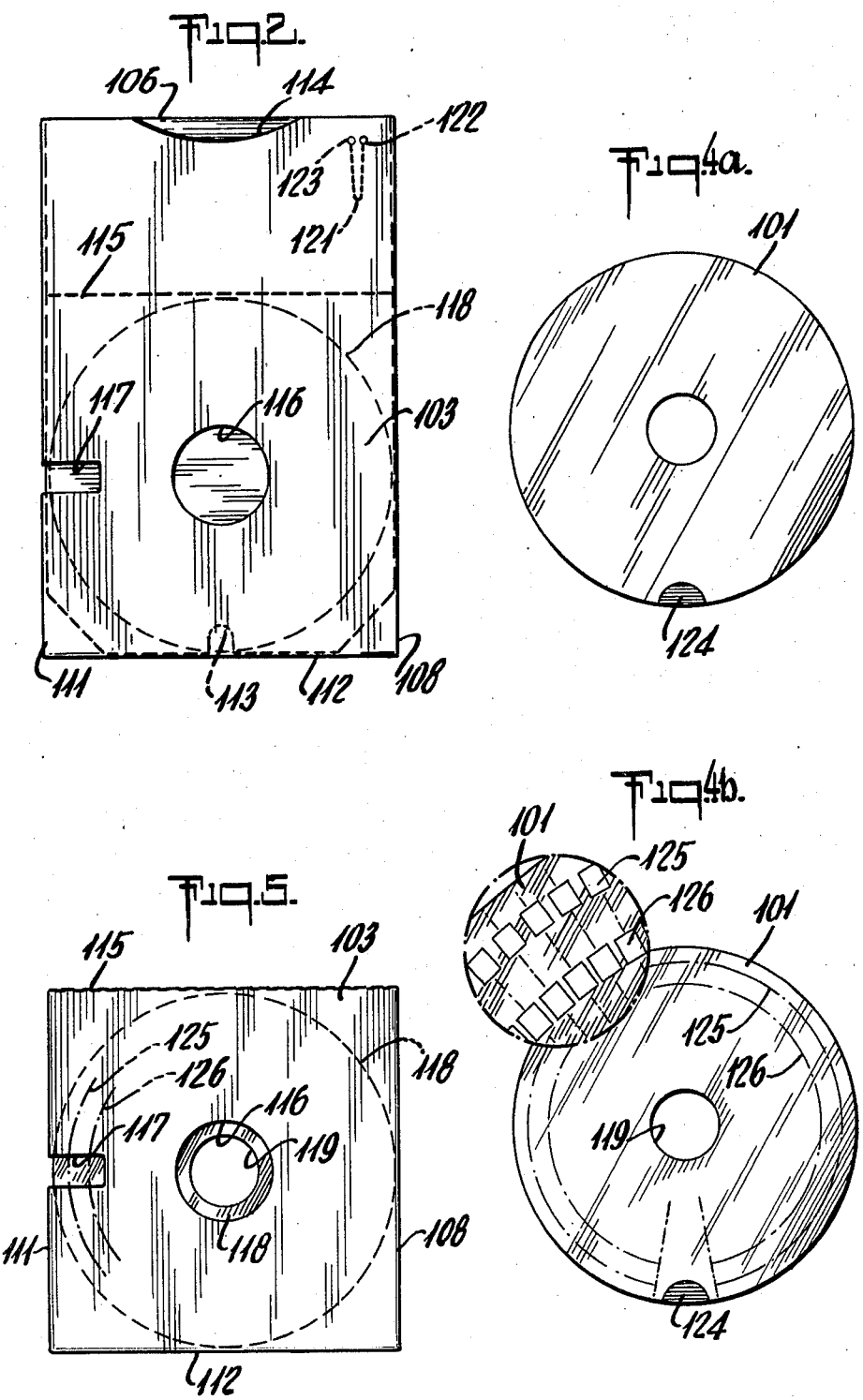

STORAGE AND RECORD SYSTEM FOR A LARGE NUMBER OF ASSOCIATED IMAGES

This is a continuation of application Ser. No. 87,849, filed Oct. 24, 1979.

FIELD OF THE INVENTION

This invention relates to image storage and retrieval, and more particularly to disk style systems for recording and storage of sequentially associated photographic images such as from clinical, diagnostic, and medical screening systems.

BACKGROUND OF THE INVENTION

Many researchers in diagnostic imaging and screening fields have voiced concern that as the technological capabilities of various methods improve, the sheer volume of data produced will become overwhelming, dangerously near the point at which retrieval and evaluation, rather than imaging resolution and effectiveness, are the critical parameters. For example, presently the field of ultrasound diagnostic imaging is being successfully applied to the field of breast screening. Resolutions in the range of 1 millimeter are realistic, yielding tremendous diagnostic capacity but further requiring as many as 100 images needed fully to scan a breast. When it is contemplated that screening centers will process hundreds of patients each day, it becomes evident that the technological capabilities to display detail will far outstrip the clinician's ability to appreciate it.

Accordingly, it is an object of the present invention to provide image storage and display systems which permit convenient and highly accessible storage facility.

Inevitably, mass screening instruments and programs, such as ultrasound breast screening programs, are falling with the gambit of responsibility of hospital radiology departments. Such departments, of course, have through the years developed considerable expertise in photographic information systems, and have committed themselves to substantial expenditures in the areas of developing, cataloging, and storing records, such as X-ray packs.

It is an associated object of the present invention to utilize established technologies and procedures of information storage which have found widespread acceptance in conjunction with X-ray technology. As associated objects, photographic images are to be obtained with a relative maximum of simplicity and security with respect to the photographic medium during the photographing process, en route to development facilities, and in preparation for development. Furthermore, it is an object that substantial portions of the system be retained as permanent file jackets, records, and entries once the photographic exposure, development, and completion processes are achieved.

SUMMARY OF THE INVENTION

The present invention incorporates photographic disk and multiple part nesting envelope systems whereby undeveloped film is safely secured, and the disk is conveniently exposed for information gathering purposes yet is securely conveyed for development, and wherein the same envelope system may be utilized as a combination storage file and display carrier module.

In accordance with the principles of the present invention, a disk of film in the range of 8 inches in diameter is adapted to receive multiple, sequentially associated images about its periphery. The film disk is adapted to be carried within a pair of inversely nesting envelopes (i.e. the open side of one deepest in the closed side of the other). The inner envelope is solid and opaque but for a recess at its lower, open end, which thereby exposes a corresponding tab area of the disk therewithin. The outer envelope has a recess at its top open end for withdrawal of the inner envelope, and has holes or voids at its lower part, one in the center surrounding the center of the disk, another at an outer periphery to enable sequential image exposures on the disk. The developed tab portion serves as a start/stop reference.

Upon completion of the development of the exposed images on the disk, the inner envelope is discarded and the outer envelope is foreshortened to the size necessary for enclosure of the disk. In turn, the foreshortened outer envelope constitutes a storage file which protects the disk, and also serves as a cartridge for mounting the disk in a suitable display apparatus.

DESCRIPTION OF THE DRAWINGS

FIG. 1 shows a detached, three-part system embodying the principles of the present invention, including a disk and two envelope portions;

FIGS. 2 and 3 show respective orientations or combinations of the three parts of the system, FIG. 2 representing storage prior to development, and FIG. 3 representing positioning exposure of the disk;

FIGS. 4A and 4B show views of the disk prior to and subsequent to development of images thereon; and FIG. 5 shows a disk and envelope combination cartridge, subsequent to development, for storage and display as desired.

BEST MODE FOR CARRYING OUT THE INVENTION

Referring first to FIG. 1, there is shown an exploded view of a three-part system embodying the principles of the present invention. Like components have identical numbers in the subsequent figures. FIG. 1 shows two envelope portions, one designated an "inner" envelope 102, and one designated an "outer" envelope 103. Both are rectangular in configuration, with the inner envelope 102 having respective "short" sides 104 and 106, and respective "long" sides 105 and 107. Similarly, outer envelope 103 has "long" sides 108 and 111 and "short" sides 109 and 112. The inner envelope 102 is closed on the long sides 105 and 107 and on the top short side 106, but is open on the lower short side 104, advantageously defining an opening for the full extremity of short side 104. Outer envelope 103 is closed on long sides 108 and 111 and on the lower short side 112, but is open on top short side 109, preferably for the full extremity of that short side. The inner envelope 102 is adapted to nest completely within the outer envelope 103, with the opening on side 104 within and at the bottom of envelope 103 (i.e. "an inverted nested relationship" or "inversely nesting"). Inasmuch as the envelopes 102 and 103 are to carry an element of photographic film prior to exposure and also subsequent to exposure but prior to development, a close-fitting nested relationship is desirable, with the inner envelope 102 having dimensions which are close fitting within envelope 103, but which allow relatively free, unbinding sliding movement therewithin, for easy forced withdrawal of envelope 102 from envelope 103. Further, it is preferable that both envelopes 102 and 103 be made of heavy, opaque material to prevent spurious exposure of the photographic medium therewithin.

Also shown in FIG. 1 is a disk 101 which has an opening at its center 119 and which includes an appropriate section of photographic medium for exposure, development, and subsequent display of relevant information in the form of sequentially associated images. At least, the disk 101 has at least a portion of an annulus 118, defined in FIG. 1 by an inner radius 120 and the outer radius of the disk 101, which is of photographic medium. Preferably, the entire such annulus is of photographic medium and occurs about the circumference of the disk 101, and in a preferred embodiment the entire disk 101 is made of conventional commercially available X-ray type film.

In a preferred construction, the composite of which is shown in FIG. 2, the disk 101 is carried within inner envelope 102, being inserted therein through opening 104. In a preferred embodiment, the disk 101 is approximately 8 inches in diameter, and the envelope 102 is slightly larger than that in order to accommodate free passage of the disk into and out of the inner envelope 102, yet to maintain it in fairly fixed position. To facilitate such positioning, an optional but preferred stop 127 is provided, above the open short side 104 by slightly more than the diameter of the disk, to fix the position of the disk within envelope 102. In a preferred embodiment, the stop 127 is achieved by a bonding of corresponding opposite sides of the envelope 102. As may be most clearly noted from FIG. 1, the inner envelope 102 defines a recess 113 along the lower, open side 104, to permit, as disclosed hereinafter, careful removal of the disk from the inner envelope 102. With the disk 101 carried in the inner envelope 102, the inner envelope 102 is inversely nested within outer envelope 103. For purposes of subsequent withdrawal of the inner envelope 102, outer envelope 103 defines a recess 114 along the top edge. As may be seen from FIG. 2, a portion of edge 106 of envelope 102 thereby is exposed for easy grasping and withdrawal. The outer envelope 103 also has a perforation 115 thereacross, which is described hereinafter, and openings 116 and 117.

The openings 116 and 117 relate to film exposure and display, as described hereinafter, and as shown in FIG. 2, the openings 116 and 117 are filled by the inner envelope 102 when the three-part system is nested as shown in FIG. 2. Also as shown in FIG. 2, during the assembly process, a string or the like material 121 is connected both to the inner portion of outer envelope 103 at point 122, and to the outer portion of inner envelope 102 at point 123. The string 121 functions to limit the extent of travel of inner envelope 102 upon withdrawal from outer envelope 103, as shown in FIG 3. It will be evident that alternative means may be employed, rather than a string 121, which serve similarly to limit the travel of withdrawal of inner envelope 102 from outer envelope 103 (e.g. folds, tabs, etc.).

Accordingly, as shown in FIG. 2, the composite system including film disk 101, inner envelope 102, and outer envelope 103, when assembled such as shown in FIG. 2, protects the disk 101 from physical damage and from spurious exposure prior to exposure and development, when and as desired.

It is anticipated that in utilization of the principles of the present invention, there will be provided a camera mechanism which is adapted to receive the composite system as shown in FIG. 2 in a substantially dark environment, whereby portions of the film which are to be exposed through recess 117 of envelope 103 (upon removal of inner envelope 102) will photographically imprint the disk 101. Many such systems are more or less conventional in cameras of known pedigree, and adaptation thereof to embodiments of the present invention is readily within the ability of those of ordinary skill in the art. Once the FIG. 2 system is inserted into a suitable slot or position for exposure, the inner envelope 102 is partially upwardly withdrawn, as shown in FIG. 3, by the simple expediency of grasping inner envelope 102 at the position of void 114 in outer envelope 103. It is noted that suitable simultaneous pressure then applied to outer envelope 103 in the region overlying recess 113 of the inner envelope 102, whether manually or automatically applied, will result in the disk 101 being held in place in the bottom portion of outer envelope 103, as shown in FIG. 3, it being understood that at that time the mechanism is within the camera and the disk 101 is not being exposed to ambient or spurious light. As noted in FIG. 3, the string 121 is then extended to its limits, thereby correspondingly to limit the amount of travel of the inner envelope 102 with an upper portion of the disk 101 still nested within the lower extremities of inner envelope 102. In this fashion, once the exposure process has been completed, inner envelope 102 may be pushed downwardly once more to enclose disk 101 as shown in FIG. 2, for security between the time of exposure and time of development of the film portion of disk 101.

As the system is held in the camera apparatus in the positioning shown in FIG. 3, exposure may commence, with the disk 101 being grasped generally in its center area, through void 116 of the outer envelope 103, and rotated thereabout. In this fashion, the outer periphery of the disk 101 will be incrementally passed through the void 117 of envelope 103. During such incremental rotation, sequential images, such as of adjacent cross sectional areas of an organ, may be transferred to the disk, a picture at a time.

Referring briefly to FIGS. 4A and 4B, this sequential exposure of the disk 101 may perhaps be better understood. FIG. 4A shows an undeveloped disk, with an exposed area 124 being formed on the disk during the initial system assembly process, by virtue of the recess 113 at the bottom of inner envelope 102. This exposed area 124 forms a convenient reference point on the disk 101 with respect to which the individual sequentially associated images may be transferred to the disk. Referring to FIG. 4B, a disk is shown with pictures developed thereon. In a preferred embodiment, the disk 101 includes an outer ring of images 125 and an inner ring of images 126, suitable sequentially arrayed relative to the reference exposure area 124. Conveniently, then, the outer ring may depict one series of images (e.g. cross sections of the right breast), whereas the inner ring may include a corresponding alternative series of images (e.g. cross sections of the left breast). It will be apparent that depending upon the application, numerous sequences of images or photos may be utilized in a desired number of concentric rings about the center 119 of the disk 101.

Returning, then, to FIG. 3, it will be understood that within the camera, a sequence of exposures will be transferred to the disk 101 to result in a configuration as shown in FIG. 4B. Thereupon, the inner envelope is downwardly pushed to its original inverted nested position within outer envelope 103, as shown in FIG. 2. Thereupon, the film pack is suitably conveyed to a place for development, whereby the photos or images to which disk 101 has been exposed, are permanently developed thereon.

After the disk 101 is developed, the inner envelope 102 may be discarded, of course entailing removal of the string 121 as well. For purposes of convenience, the outer envelope may be torn across perforation 115, yielding a permanent storage record as shown in FIG. 5, with the foreshortened outer envelope 103 remaining, and the developed disk 101 stored therein, and with image series 125 and 126 being serially presented through the opening 117 as the entire disk 101 is rotated about its center of rotation.

It is to be understood that the foregoing sets forth preferred and illustrative embodiments of the principles of the present invention, but that numerous alternatives will occur to those of ordinary skill in the art without departure from the spirit or scope of the principles of the present invention.

What is claimed is:

1. A system for recording and preserving a plurality of sequentially associated images comprising:
   a. a disc having a center of rotation and consisting of photographic film for at least a portion of an annulus having its outer circumference at a predetermined radius from said center;
   b. first envelope means having an opening on one side, designated "bottom", to accommodate free passage of said disc, said first envelope means being adapted to carry said disc in freely removable, positionally certain relationship adjacent said opening, said first envelope means defining a recess on said one side along said opening, to facilitate removal of said disc;
   c. second envelope means having an opening on one side, designated "top", for receiving said first envelope means in inverted nested relationship therein, with said bottom side of said first envelope means being located generally opposite said top side of said second envelope means, for optional retention of said disc within said second envelope means upon at least partial withdrawal of said first envelope means, said second envelope means defining a first void therein corresponding to said center of said disc, and a second void located said radius outwardly from said first void;
   d. wherein said second envelope means further defines a recess along said top opening to facilitate withdrawal of said first envelope means;
   e. and further comprising means associated with said first and second envelope means, for limiting the travel or withdrawal of said first means from said second means, but permitting exposure of said film portion of said disc through said second void as said disc is retained in said second envelope means.

* * * * *